United States Patent
Zenzinger et al.

(10) Patent No.: US 12,372,477 B2
(45) Date of Patent: Jul. 29, 2025

(54) METHOD FOR TESTING A COMPONENT

(71) Applicant: MTU Aero Engines AG, Munich (DE)

(72) Inventors: Guenter Zenzinger, Waakirchen (DE); Anian Goegelein, Munich (DE); Hans-Uwe Baron, Munich (DE)

(73) Assignee: MTU Aero Engines AG, Munich (DE)

(*) Notice: Subject to any disclaimer, the term of this patent is extended or adjusted under 35 U.S.C. 154(b) by 268 days.

(21) Appl. No.: 18/191,499

(22) Filed: Mar. 28, 2023

(65) Prior Publication Data

US 2023/0314339 A1 Oct. 5, 2023

(30) Foreign Application Priority Data

Mar. 29, 2022 (DE) .............. 10 2022 107 445.5

(51) Int. Cl.
*G01N 1/28* (2006.01)
*G01N 21/91* (2006.01)

(52) U.S. Cl.
CPC ............. *G01N 21/91* (2013.01); *G01N 1/286* (2013.01)

(58) Field of Classification Search
CPC .......................... G01N 1/286; G01N 21/91
See application file for complete search history.

(56) References Cited

U.S. PATENT DOCUMENTS

| | | | |
|---|---|---|---|
| 3,341,010 A | 9/1967 | Switzer | |
| 3,509,762 A | 5/1970 | Conway et al. | |
| 3,927,551 A | 12/1975 | Alburger | |
| 4,069,419 A * | 1/1978 | Molina | G01N 21/91 |
| | | | 252/960 |
| 4,375,384 A * | 3/1983 | Molina | G01N 21/91 |
| | | | 252/301.19 |
| 2011/0023543 A1 | 2/2011 | Umetsu et al. | |
| 2017/0356849 A1* | 12/2017 | Henderkott | G01N 21/643 |

FOREIGN PATENT DOCUMENTS

| | | | |
|---|---|---|---|
| CA | 2829578 C | | 9/2012 |
| CN | 208313851 U | * | 1/2019 |
| DE | 69916853 T2 | | 4/2005 |
| DE | 102013213369 B3 | | 10/2014 |
| DE | 102015209745 B4 | | 12/2018 |
| EP | 3333284 A1 | | 6/2018 |
| EP | 3 462 165 B1 | | 2/2021 |
| GB | 684021 A | | 12/1952 |
| GB | 878751 A | | 10/1961 |

OTHER PUBLICATIONS

English translation of CN 114878588 A (Year: 2019).*

(Continued)

*Primary Examiner* — Mark R Gaworecki
(74) *Attorney, Agent, or Firm* — Hinckley, Allen & Snyder, LLP; David Josephs

(57) ABSTRACT

The present invention relates to a method for testing a component by a penetrant test, in which a penetrant is introduced onto a surface of the component; at least one portion of the penetrant is removed from the surface by blasting the surface with a solid blasting material; the surface is optically detected after the blasting.

20 Claims, 3 Drawing Sheets

(56) References Cited

OTHER PUBLICATIONS

Karigiannis, John et al., Multi-Robot System for Automated Flurorescent Pentrant Indication Inspection wiht Deep Neural Nets, 2021, Science Direct, Procedia Manufacturing 53 (2021) 735-740.

FinnSonic Oy Parikankatu 8 FIN-15170 Lahti Finland, Automatic FPI Process Line for Jet Engine Parts, 2015, https://www.finnsonic.com/eng/aviation-fpi-and-cleaning-solutions/fpi/fpi-concepts, website and YouTube video.

Promag NDT, "FPI Total Solutions", 2018, https://www.pmtndt.com/fpi-total-solutions/.

* cited by examiner

METHOD FOR TESTING A COMPONENT

BACKGROUND OF THE INVENTION

The present invention relates to a method for testing a component by a penetrant test.

In penetrant testing, a penetrant is introduced onto the component surface, for example, in order to visualize defects in the surface, e.g., cracks or voids. The penetrant is applied into the defect sites, based on capillary forces for example, so that said sites are well visible in a subsequent optical inspection. In this way, the component can be investigated, e.g., after its manufacture or also in the scope of maintenance after a specific operating time, whereby, for example, a further crack expansion and consequently a failure during operation can be prevented.

As discussed in detail in the following, the component can be provided, e.g., for a turbomachine, in particular for an aircraft engine. Because of the consequences that a component failure can have in this field of application, its quality and testing have particular significance.

DISCLOSURE OF THE INVENTION

The present invention is based on the technical problem of providing an advantageous method for testing a component by a penetrant test.

This is achieved according to the method of the present invention. In this method, the component surface is blasted after the introduction of the penetrant and prior to the optical detection, namely by using a solid blasting material; a rather excessive amount of penetrant, at least proportionally, is then abraded from the component surface. The blasting material itself is solid, thus is provided in particle form, and it is supplied in a fluid flow onto the component surface. In this way, the process parameters such as, for example, pressure and exposure time can be well controlled or adjusted, which can be of advantage, for example, with respect to reproducibility. Also, an excessive removal of the penetrant, for example, a washing out from defect sites, particularly from small cracks, can be prevented. The objectification that accompanies the increased reproducibility can be of advantage, e.g., also with respect to an automation; thus it permits a component test with reduced intervention or even completely without human intervention.

Preferred embodiments are found in the disclosure overall and particularly in the claims, whereby in the presentation of the features, a distinction is not always made individually between the different claim categories. If, for example, a specific penetrant method is described, this is also to be understood as a disclosure of a corresponding penetrant test device, and vice versa.

The inventors have observed an undesirable washout particularly if the penetrant is mechanically abraded, e.g., with a brush immersed in solvent. This manual process also cannot be easily automated, and the process parameters (e.g., speed and amount of solvent) greatly depend on the particular test ordered. In this case, a partial washout may be disadvantageous anyway with respect to comparability, and defect sites that are completely washed out can no longer be detected.

In general, the penetrant test is preferably a fluorescent penetrant inspection (FPI); thus, a fluorescent penetrant is provided. During optical detection, the latter can be made visible, e.g., by UV irradiation, whereby good luminance contrast can be achieved. As a result, relatively small defect sites in which the penetrant has accumulated also can be made visible thereby.

According to a preferred embodiment, the surface has an intermediate cleaning prior to the blasting, for example, by spraying a solvent thereon. The entire excess penetrant thus need not be abraded from the surface just by the blasting, which, for example, can be of advantage with respect to consumption of resources. For example, blasting can be carried out then in a targeted manner only in places where penetrant remains on the surface after the intermediate cleaning.

In a preferred embodiment, in addition to the optical detection in step iii), the surface is also optically detected after the intermediate cleaning and prior to the blasting. In the case of a fluorescent penetrant, after the intermediate cleaning, for example, blasting may be carried out with UV irradiation, and those sites on the surface on which penetrant is still present can be identified. The subsequent blasting then helps to differentiate whether we are dealing with actual defect sites from which the penetrant has not been abraded, or whether we are dealing with residues not removed in the intermediate cleaning.

In general, a developing step is preferred, in which the penetrant is developed. During this step, the penetrant can accumulate, for example, deep in a defect site and an increased contrast can be created relative to the surrounding surface region. According to a preferred embodiment, in any case there is a developing step between steps ii) and iii); optionally, there can be an additional developing step prior to the blasting (that is, after the intermediate cleaning and before the first optical detection; refer to the preceding paragraph).

As mentioned initially, the present subject matter is directed particularly to an automation, for which reason the blasting is produced robotically in a preferred embodiment. Thus, for example, a nozzle from which the blasting material is emitted can be guided along the surface with the help of a robotic arm. In this case, for example, combined with a preceding automated image acquisition and processing, those sites that are to be blasted for distinguishing between defect sites and penetrant residues can be approached in a targeted manner.

According to a preferred embodiment, the blasting material is blasted in the form of a liquid-solid mixture onto the surface; thus, it is in a mixture with a liquid. Each time depending on the mixing ratio, the particles can thus be supplied onto the surface in a liquid flow or the particles can be supplied as particles wetted with the liquid. The liquid is a solvent, preferably ethanol, in a preferred embodiment. On the one hand, the particles moistened with the solvent, depending on the solvent, for example FPI oil, can easily chemically dissolve the penetrant from the surface. On the other hand, the blasting material can then easily remove the dissolved penetrant from the surface and at the same time achieve a mechanical cleaning effect.

In general, the liquid-solid-mixture can be emitted from a common nozzle; the latter thus supplies the mixture and emits it in blasting form. In an alternative preferred embodiment, the blasting material and the liquid are each emitted in their own nozzle, then these individual emissions are combined, and thus are superimposed on the surface.

Independently of the type of supply (by way of a mixed emission or from separate nozzles), the particles of the blasting material have a size of at least 0.1 mm in preferred embodiment. An undesirable washout from small cracks can be prevented, for example, by specifying a minimum size.

An advantageous upper limit of particle size. which may be of interest independently from the minimum size and shall be disclosed, can lie, e.g., at 0.4 mm.

As solid blasting material, in general, any solid state material in particle form can be provided, for example, glass particles. Another form of solid blasting material can be dry ice. Dry ice particularly cleans without residue, since $CO_2$ evaporates after striking the surface to be cleaned. The solid blasting material in combination with solvent or even alone can produce a cleaning effect. In preferred embodiment, plastic particles are provided, usually a plastic granulate. Suitable plastics can be, for example, urea or melamine mesh 60-80. Another preferred embodiment is the combination of dry ice with solvent (ethanol); this combination can be introduced from one or two nozzles onto the surface to be cleaned. As already mentioned, the penetrant test is preferably carried out by the FPI method. In this case, e.g., an FPI oil can be used; on the one hand, undesired residue may be produced on the surface; on the other hand, a washout from defect sites could nullify the fine resolution of the FPI method, for which reason, the advantages of the present method particularly come into play.

In preferred embodiment, the tested or investigated component involves a component of a turbomachine; refer also to the remarks in the scope of the evaluation of the prior art. In particular, the components provided for arrangement in the gas duct, such as, e.g., blade or vane elements and duct plates, etc., can be subjected to special loads, for which reason the reliable detection of detect sites takes on a particular significance.

According to a preferred embodiment, the component involves an additively manufactured component. Thus, for example, based on a data model, this component can be built up layer by layer from an initially formless or form-neutral material, e.g., in a powder bed process. Based on the layer-by-layer construction, the surface can be complex, which, in contrast, may promote residual matter in the penetrant test, or may require a particularly high quality of the test result. Thus, the initially mentioned advantages and the accompanying objectivization advantageously come into play.

The invention also relates to a penetrant test assembly that comprises a module for introducing the penetrant, a module for blasting the surface, and a module for optical detection of the surface. In principle, a (partial) integration of the modules is also conceivable; however, preferably, the component is guided from module to module in the course of the test.

The module for optical detection can be equipped, in particular, with a camera and an image processing system, so that the evaluation can be automated. For example, a robot arm equipped with the one or more nozzles can be provided in the module for blasting the component; see the above description. Additional modules are also possible, e.g., for intermediate cleaning and/or developing.

The invention further relates to the use of such a penetrant test assembly in a method as described above.

BRIEF DESCRIPTION OF THE DRAWINGS

The invention will be explained in more detail in the following on the basis of an example of embodiment, wherein the individual features in the scope of the independent claims can also be essential to the invention in another combination, and wherein also no distinction is made individually between the different claim categories.

Taken individually.

DESCRIPTION OF THE INVENTION

Figure 1:
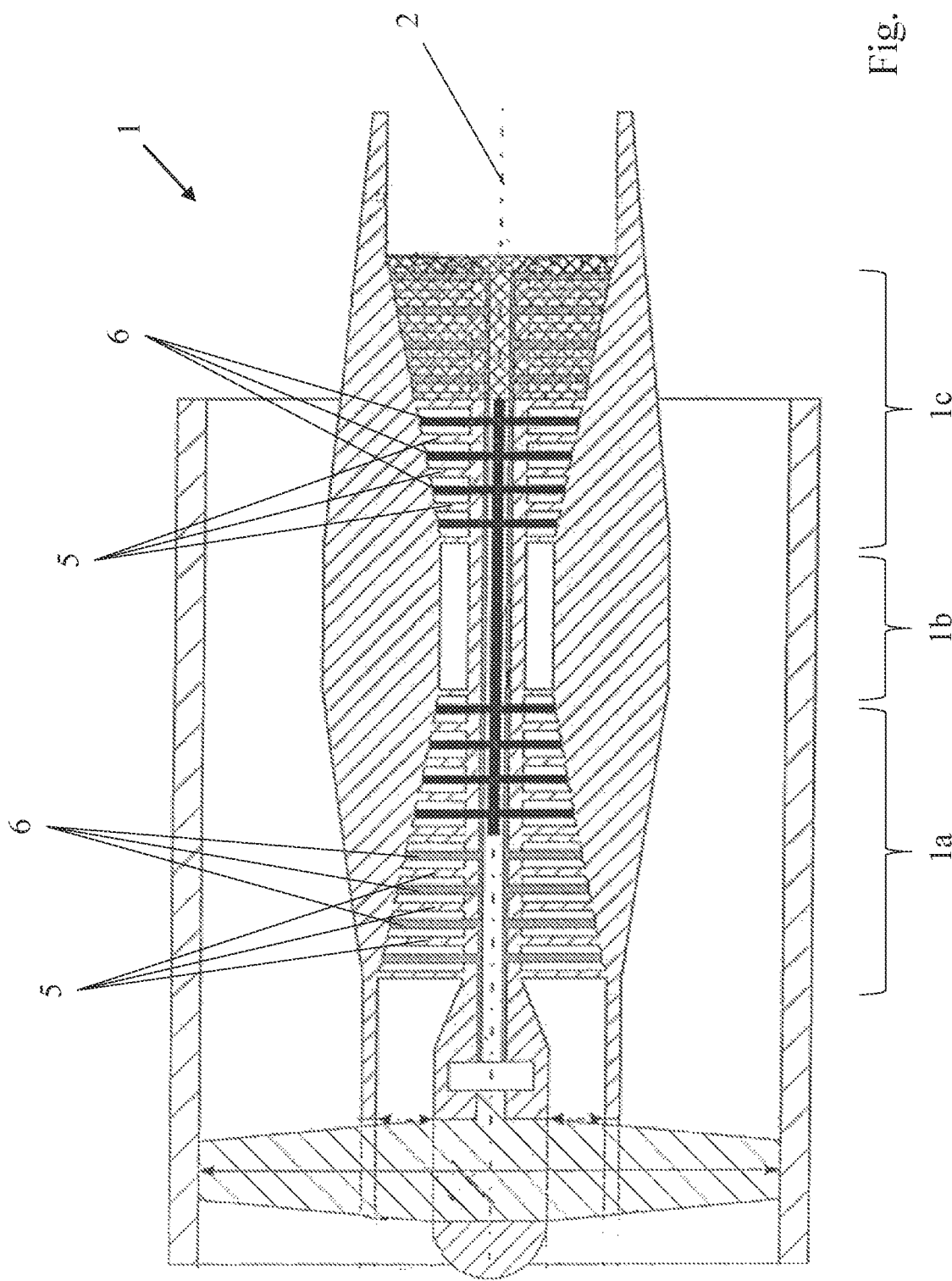
FIG. 1 shows, in a schematic diagram, a turbofan engine, for illustrating an advantageous field of application of the penetrant test.

FIG. 1 shows a turbomachine 1, specifically a turbofan engine, in an axial section. The turbomachine 1 is functionally divided into compressor 1a, combustion chamber 1b, and turbine 1c. Both the compressor 1a as well as the turbine 1c are each constructed of several stages; each stage is composed of a guide vane ring and a rotating blade ring following thereon. The aspirated air is compressed in the compressor 1a; it is then burned in the downstream combustion chamber 1b with kerosene mixed in. The component discussed in the following may particularly be provided for application in such a turbomachine 1; for example, it may involve a blade or vane arranged in the compressor duct or hot gas duct (guide vane 5 or rotating blade 6), but it may also involve a component installed for another purpose in the machine.

Figure 2:
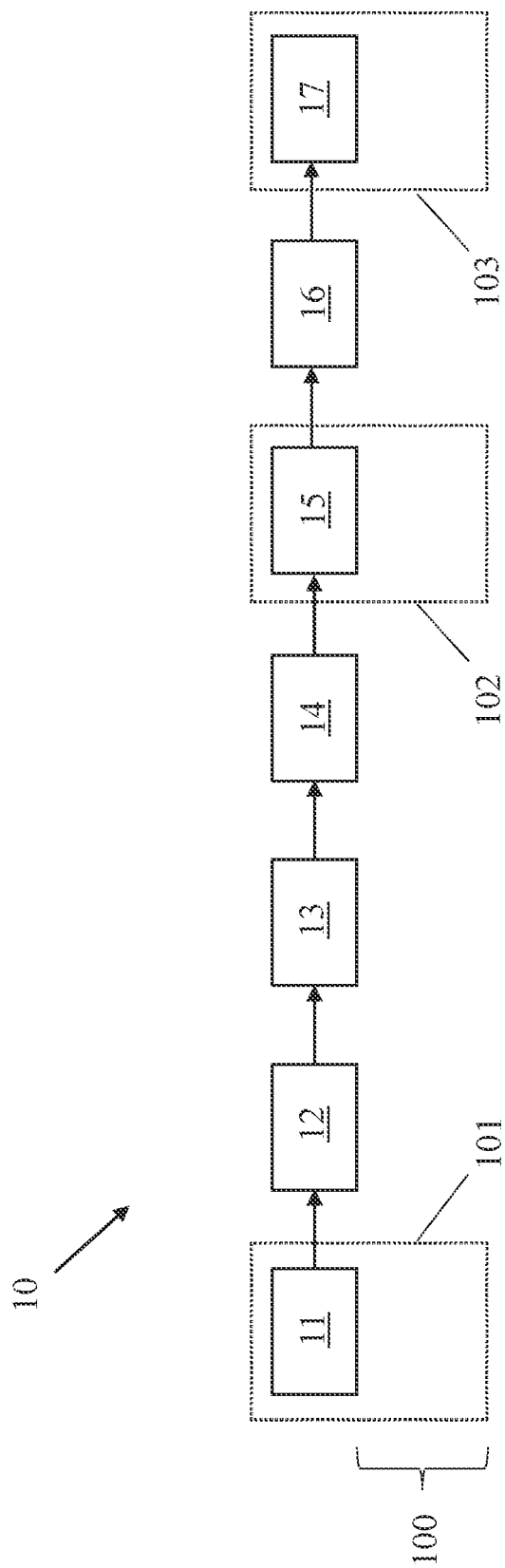
FIG. 2 shows the course of a penetrant test in a flow chart.

FIG. 2 illustrates a penetrant test 10 in a schematic flow chart. After a penetrant is introduced 11, first an intermediate cleaning 12 is conducted before the penetrant is developed a first time 13. Subsequently, the surface is optically detected a first time 14, wherein detected sites are subsequently post-treated by blasting 15; see the description in detail below. After this, the penetrant is developed a further time 16 before the surface is again optically detected 17. As results from the introduction to the description in detail, several of these steps are optional.

The different steps can be carried out in different modules of a penetrant test assembly 100; in particular, the introduction 11 can be conducted in a first module 101, the blasting 15 can be conducted in a second module 102, and the optical detection 17 can be conducted in a third module 103, whereby the first optical detection 14 also can take place in the latter module.

Figure 3C:
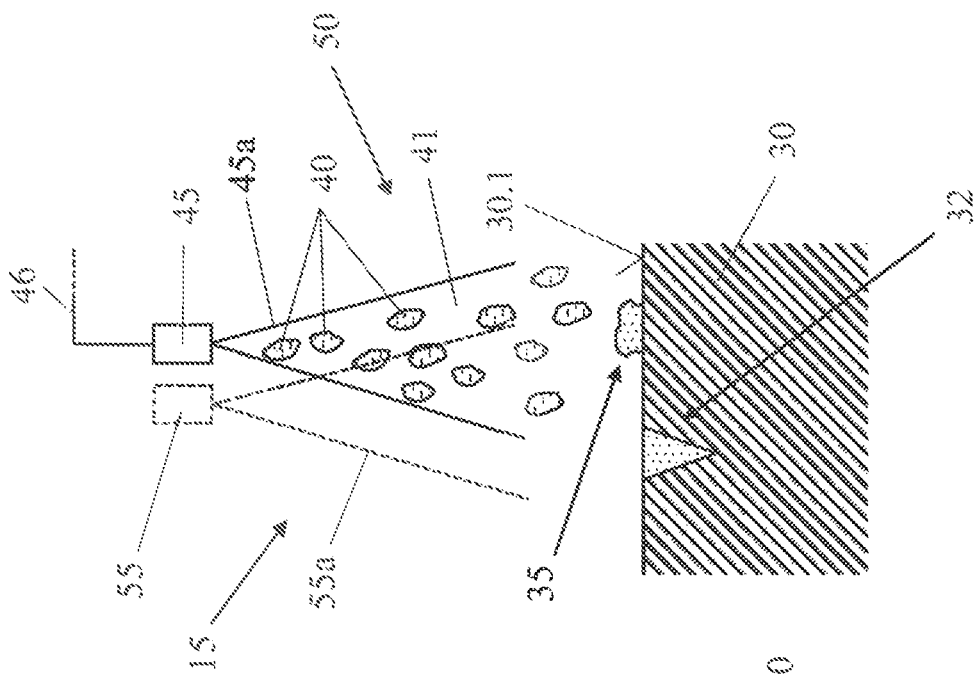
FIGS. 3a-c show selected steps in the penetrant test according to FIG. 2 in a detail drawing.
Figure 3B:
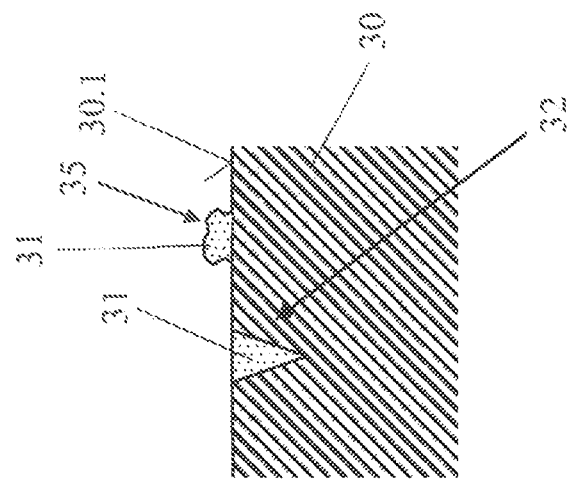
Figure 3A:
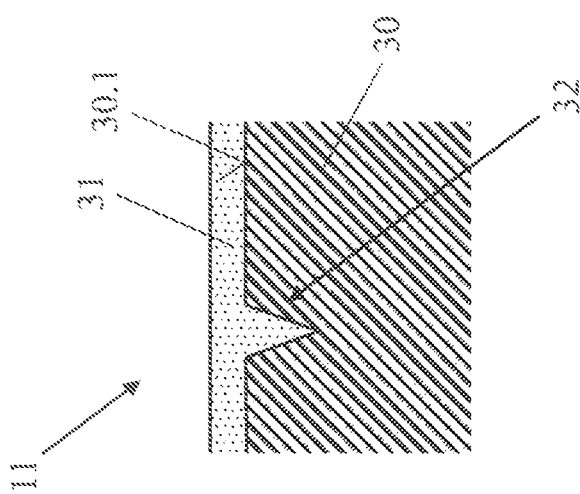

FIG. 3a illustrates the introduction 11 in a detail view. The penetrant 31 is introduced in excess onto the surface 30.1 to be investigated of a component 30, wherein it is applied to any defect sites 32 (cracks, pores, soldering defects, etc.).

FIG. 3b shows the component 30 after the intermediate cleaning 12; thus, for the most part, excess penetrant has been removed from the surface 30.1. However, the penetrant 31 remains in the defect site 32; there is also a residue 35 on the surface 30.1 that has not been correctly removed. In the first optical detection 14, the defect site 32 and the residue 35 cannot be clearly distinguished from one another; therefore, the component 30 is subjected to blasting 15.

This blasting is illustrated in FIG. 3c. The surface 30.1 is blasted with a solid blasting material 40, plastic particles with a size between 0.1 mm and 0.4 mm in the present case. These particles are supplied as a mixture 50 with a liquid 41 on the surface 30.1; in this example, a mixture with ethanol. The solvent can chemically dissolve the residue 35 from the surface; the blasting material 40 then brings about a mechanical removal and transport. Conversely, the penetrant 31 disposed in the defect site 32 is not washed out; the defect site 32 can thus still be detected. In the subsequent optical detection, therefore, only the defect site 32 is still recognized as such.

In the blasting, a nozzle 45, from which the blasting material 40 is emitted, can be moved along the surface 30.1, guided by a robot arm 46. In this case, a single nozzle can emit the mixture 50 made up of the liquid 41 and the blasting material 40. Alternatively, however, separate nozzles 45, 55 (indicated only by dashed lines), whose blasts 45*a*, 55*a* can then be superimposed, can also be provided for the blasting material 40 and the liquid 41.

What is claimed is:

1. A method for testing a component with a penetrant test, comprising the steps of:
    i) introducing a penetrant onto a surface of the component;
    ii removing at least one portion of the penetrant from the surface by blasting the surface with a solid blasting material; and
    iii) optically detecting the surface after the blasting;
    wherein the surface is intermediately cleaned prior to the blasting and the surface is optically detected after the intermediate cleaning and before the blasting.

2. The method according to claim 1, further comprising the step of:
    developing the penetrant between the steps (ii) and (iii).

3. The method according to claim 1, wherein a nozzle, from which the blasting material is emitted, is guided by a robot along the surface in step ii).

4. The method according to claim 1, wherein, in step ii), the blasting material is blasted as a mixture with a liquid onto the surface.

5. The method according to claim 4, wherein the liquid contains a solvent.

6. The method according to claim 4, wherein the liquid and the blasting material are each emitted as a blast from a separate nozzle, and the blasts are guided together upstream to surface.

7. The method according to claim 1, wherein the blasting material is provided in the form of particles with a size of at least 0.1 mm and at most 0.4 mm.

8. The method according to claim 1, wherein the blasting material is provided in the form of plastic particles or dry ice.

9. The method according to claim 1, wherein the penetrant is fluorescent and is illuminated with UV irradiation during the optical detection.

10. The method according to claim 1, wherein the component is a component of an aircraft engine.

11. The method according to claim 1, wherein the component is an additively manufactured component.

12. The method according to claim 1, comprising the step of:
    using a penetrant test assembly including:
        a first module, which is configured and arranged for introducing a penetrant onto a surface of the component;
        a second module, which is configured and arranged for blasting the surface of the component with a solid blasting material; and
        a third module, which is configured and arranged for optical detection of the surface after the blasting.

13. A method for testing a component with a penetrant test, comprising the steps of:
    i) introducing a penetrant onto a surface of the component;
    ii) removing at least one portion of the penetrant from the surface by blasting the surface with a solid blasting material; and
    iii) optically detecting the surface after the blasting;
    wherein, in step ii), the blasting material is blasted as a mixture with a liquid onto the surface;
    wherein the liquid and the blasting material are each emitted as a blast from a separate nozzle, and the blasts are guided together upstream to surface.

14. The method according to claim 13, wherein the surface is intermediately cleaned prior to the blasting.

15. The method according to claim 13, wherein the surface is optically detected after the intermediate cleaning and before the blasting.

16. The method according to claim 13, further comprising the step of:
    developing the penetrant between the steps (ii) and (iii).

17. The method according to claim 13, wherein a nozzle, from which the blasting material is emitted, is guided by a robot along the surface in step ii).

18. The method according to claim 13, wherein the liquid contains a solvent.

19. The method according to claim 13, wherein the blasting material is plastic particles or dry ice with a size of at least 0.1 mm and at most 0.4 mm.

20. The method according to claim 13, wherein the penetrant is fluorescent and is illuminated with UV irradiation during the optical detection.

* * * * *